United States Patent
Hipke et al.

(10) Patent No.: US 11,982,760 B2
(45) Date of Patent: May 14, 2024

(54) MIMO RADAR SENSOR

(71) Applicant: Robert Bosch GmbH, Stuttgart (DE)

(72) Inventors: Arthur Hipke, Leonberg (DE);
Benedikt Loesch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 167 days.

(21) Appl. No.: 17/648,762

(22) Filed: Jan. 24, 2022

(65) Prior Publication Data

US 2022/0252693 A1   Aug. 11, 2022

(30) Foreign Application Priority Data

Feb. 5, 2021   (DE) ..................... 10 2021 201 073.3

(51) Int. Cl.
| | |
|---|---|
| G01S 13/42 | (2006.01) |
| G01S 7/03 | (2006.01) |
| G01S 13/50 | (2006.01) |
| G01S 13/931 | (2020.01) |
| H01Q 21/18 | (2006.01) |

(52) U.S. Cl.
CPC ............ G01S 7/032 (2013.01); G01S 13/931 (2013.01)

(58) Field of Classification Search
CPC ... G01S 7/03; G01S 7/42; G01S 13/48; G01S 13/931; G01S 13/00; H01Q 21/06; H01Q 1/32
USPC ....................................................... 342/372
See application file for complete search history.

(56) References Cited

U.S. PATENT DOCUMENTS

| | | | |
|---|---|---|---|
| 8,436,763 B2 | 5/2013 | Wintermantel | |
| 10,634,775 B2* | 4/2020 | Loesch | ................. G01S 13/003 |
| 2019/0391230 A1* | 12/2019 | Loesch | ................... G01S 13/42 |

FOREIGN PATENT DOCUMENTS

| | | | |
|---|---|---|---|
| DE | 102016203160 A1 | 8/2017 | |
| WO | 2015188987 A1 | 12/2015 | |

* cited by examiner

*Primary Examiner* — Vladimir Magloire
*Assistant Examiner* — Remash R Guyah
(74) *Attorney, Agent, or Firm* — NORTON ROSE FULBRIGHT US LLP; Gerard A. Messina

(57) ABSTRACT

A MIMO radar sensor includes: an antenna arrangement including first and second arrays, in each of which a respective plurality of antennas are offset relative to one another in a first direction, the first and second arrays being offset from each other in a second direction that is perpendicular to the first direction, the antennas of the first and second arrays being more strongly focused in the second direction than in the first direction in each case, and, in each of at least one of the first and second antenna arrays, at least two of the antennas of the respective array being offset from one another in the second direction and the antennas of the respective array being symmetrically arranged relative to an axis running in the second direction; a high frequency element; and a control and evaluation device for evaluating output from the high frequency element regarding the antennas.

8 Claims, 3 Drawing Sheets

MIMO RADAR SENSOR

CROSS REFERENCE

The present application claims the benefit under 35 U.S.C. § 119 of German Patent Application No. DE 10 2021 201 073.3 filed on Feb. 5, 2021, which is expressly incorporated herein by reference in its entirety.

FIELD

The present invention relates to a multiple input multiple output (MIMO) radar sensor including:
- a planar antenna array including two subarrays, in each of which multiple antennas are offset with regard to one another in a first direction x, the subarrays being offset from one another in a second direction y, that is perpendicular to first direction x, the antennas of the two subarrays being more strongly focused in second direction y than in the first direction in each case, and at last two of the antennas being also offset from one another in second direction y in at least one of the subarrays,
- a high frequency element for generating transmit signals for the antennas of the one subarray and for preprocessing the received signals of the antennas of the other subarray, and
- a control and evaluation device that is configured to control the high frequency element and to determine distances, relative velocities as well as azimuth and elevation angles of located objects based on the preprocessed received signals.

In particular, the present invention is concerned with a radar sensor for motor vehicles.

BACKGROUND INFORMATION

When monitoring the surroundings in driver assistance systems for motor vehicles, in addition to the distance and the relative velocity of the located radar targets, the azimuth angle and the elevation angle of these targets are also important. For example, information about the azimuth angle is needed, so that the object may be assigned to a specific driving lane of the roadway. Information about the elevation angle enables an estimation as to whether the object may be driven over or under or represents a relevant obstacle. The azimuth and elevation angles of the targets may be ascertained from amplitude and/or phase differences of the signals of the receiving antenna elements.

According to the MIMO principle, the receiving antennas are combined with different transmitting antennas in the time division multiplex, for example, or, optionally, also in the code or frequency division multiplex. Every combination corresponds to a virtual antenna element, whose offset with regard to another virtual antenna element is additively composed from the offsets of the involved receiving antennas and the involved transmitting antennas. The virtual array may have a larger aperture than the real receiving array and thus makes a higher angle resolution possible.

For the angle estimation, the complex amplitudes received from the different virtual antenna elements are compared to a previously measured antenna diagram and a deterministic maximum likelihood (DML) function is computed that indicates for every angle within the locating range a probability for the fact that this angle is the true locating angle of the located target. If the amplitudes of at least three virtual antenna elements are available, a quality value, which represents a measure for the quality of the angle estimation, may be moreover also computed. The angle estimation is made more difficult if in a measuring cycle, two targets are located, in which the distances and relative velocities result in the same frequency offset (in the case of a frequency modulated continuous wave radar (FMCW) radar). However, methods are available, with the aid of which the locating angles of the two targets may be resolved even under these circumstances. For an angle estimation having a quality value, the signals of at least four antenna elements are needed in this case, however.

A MIMO radar of the type mentioned at the outset, in which the antennas of a subarray are arranged at irregular distances, is described in German Patent Application No. DE 10 2016 203 160 A1. It is possible in this way to achieve a large virtual aperture using a comparably small number of receiving channels and to fill out the array at the same time to the extent that ambiguities in the angle determination may be resolved. One special characteristic of the radar sensor described in this publication is that two of the transmitting antennas are strongly focused in the azimuth, so that a high resolution is achieved in a central angle range, while a less strongly focused third transmitting antenna covers the outside areas. In addition, this third transmitting antenna is also strongly offset on the vertical, so that a precise elevation angle estimation is made possible.

A FMCW MIMO radar is described in PCT Patent Application NO. WO 2015/188987 A1, in which measuring errors that are caused by the relative movement of the target during the time division multiplex MIMO are compensated for with the aid of a specific FMCW evaluation method.

U.S. Pat. No. 8,436,763 B2 describes one example for a code division multiplex MIMO radar.

SUMMARY

It is an object of the present invention to provide a MIMO radar sensor that makes possible a more precise and more reliable angle estimation in the azimuth and in the elevation.

This object may be achieved according to an example embodiment of the present invention in that the at least one subarray, in which the antennas are also offset from one another in second direction y, is designed symmetrically to an axis running in second direction y.

If, for example, direction x is the horizontal direction and direction y the vertical direction, an azimuth angle estimation is thus made possible by offsetting the antennas of the subarrays in direction x, and the offset in direction y makes possible an elevation angle estimation. If, however, the elevation angle of an object is different from 0° the offset in direction y results in a phase difference that may impair the azimuth angle estimation. When the antennas are arranged on the horizontal at irregular intervals, the phase difference occurring in the case of a great elevation angle generally results in that the difference between the primary maximum and the secondary maxima decreases during the azimuth angle estimation. In the extreme case, this, in particular in the case of signals disrupted by noise, may result in that the angle of the secondary maximum is erroneously assumed to be the locating angle of the target. The present invention is based on the finding that this undesirable effect may be suppressed by symmetrically arranging the antennas.

Advantageous embodiments and refinements of the present inventions are disclosed herein.

In one specific embodiment of the present invention, the antennas of the two subarrays have in direction x the same aperture, preferably an aperture that is so small that the entire locating angle range is uniformly covered.

In the subarray, whose antennas do not need to be symmetrically arranged, at least one antenna element may also be offset in direction y, preferably by a value that is greater than the offset in the symmetric subarray. In this way, a higher elevation angle resolution is made possible. In the case of the azimuth angle estimation, this offset antenna is not taken into consideration, however, so that a systemic error is prevented that could otherwise be caused as a result of the strong offset of this antenna on the vertical.

One exemplary embodiment of the present invention is elucidated in greater detail below with reference to the figures.

DETAILED DESCRIPTION OF EXAMPLE EMBODIMENTS

Figure 1:
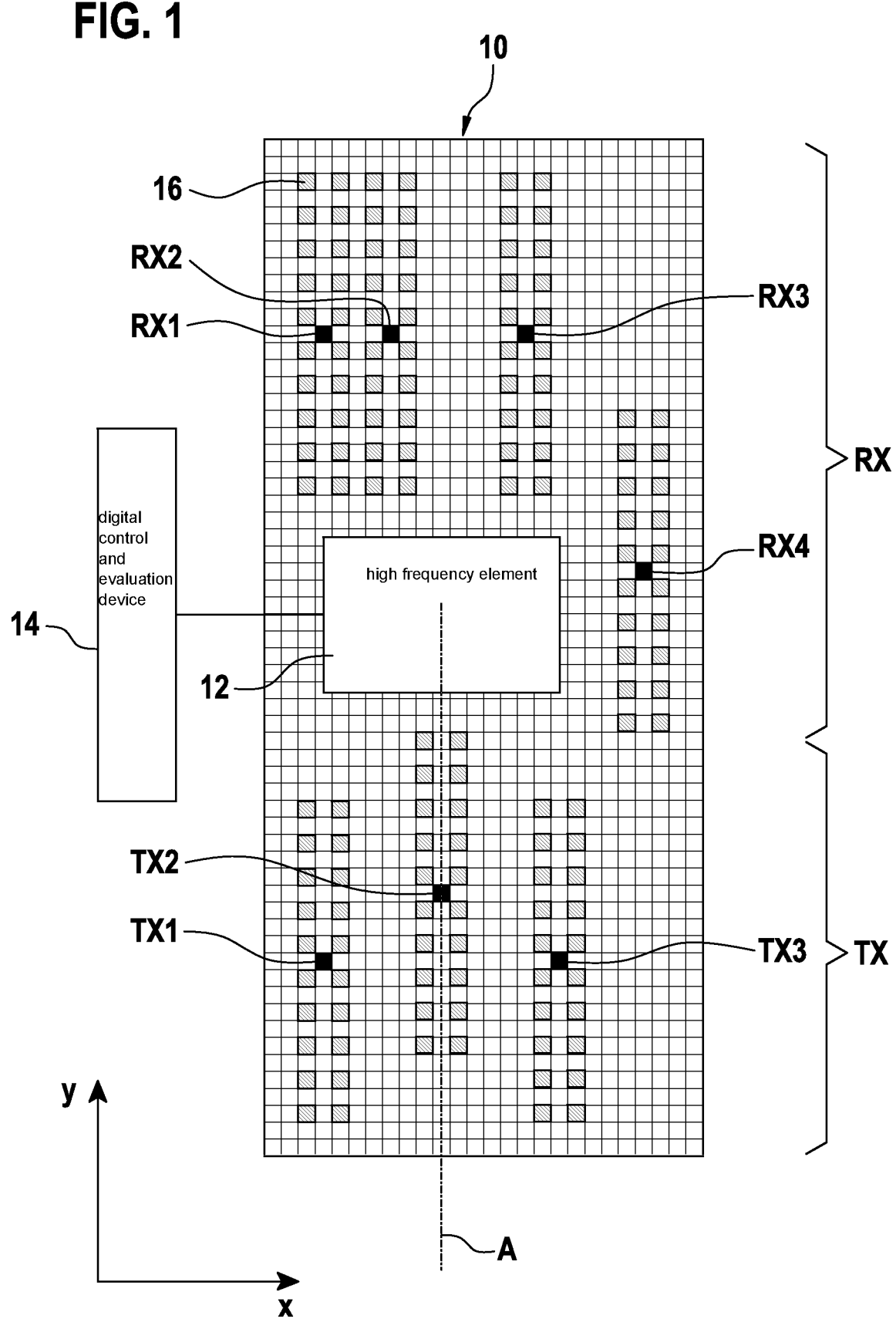
FIG. 1 shows a block diagram of a radar sensor according to an example embodiment of the present invention.

The radar sensor shown in FIG. 1 includes a circuit board 10, on which a planar antenna array including two subarrays TX and RX is formed. Subarray TX includes three transmitting antennas TX1, TX2, and TX3 that are arranged in an offset manner to one another in a first direction x (on the horizontal). Subarray RX includes four receiving antennas RX1, RX2, RX3, and RX4 that are also arranged in an offset manner from one another in direction x. Subarray RX is offset with regard to subarray TX in a second direction y (on the vertical) to the extent that the subarrays do not overlap one another on the vertical. In a spacing between the subarrays, a high frequency element 12 is situated on the circuit board, which is connected to the transmitting and receiving antennas via microwave lines (not shown) and is used to feed transmit signals into the transmitting antennas and to tap and to preprocess received signals from the receiving antennas. High frequency element 12 is formed by a microwave monolithic integrated circuit (MMIC) chip, for example, and is connected to a digital control and evaluation device 14 that controls high frequency element 12 and digitally evaluates the preprocessed received signals, to determine distances, relative velocities, azimuth angles, and elevation angles of located objects. The digitization of the signals may take place with the aid of an analog/digital converter integrated into the MMIC chip, for example, or optionally in an input stage of the control and evaluation device.

To illustrate the geometry of the transmitting and receiving antennas, circuit board 10 is shown here using a square grid pattern, whose grid cells have an edge length of ¼ of the wavelength of the microwaves. All distances between the objects on the circuit board are indicated below in units of this wavelength. All transmitting antennas and receiving antennas have the same shape and are designed as group antennas having two columns of ten antenna patches 16 each. The columns run in vertical direction y. The distance between individual antenna patches 16 amounts to ½, as does the distance between the two columns of an antenna. The guiding lines that belong to reference signs RX1, RX2, etc., lead in each case to the phase central point of the antenna (black square). In the following, all indications regarding position relationships between the antennas refer to the positions of these phase central points.

Transmitting antennas RX1, RX2, and RX3 are arranged on the same level in vertical direction y. The horizontal distance between receiving antennas RX1 and RX2 amounts to 1 and the distance between receiving antennas RX2 and RX3 amounts to 2.

Receiving antenna RX4 is offset downward in vertical direction y by 3.5 units with regard to the other three receiving antennas. Its horizontal distance from receiving antenna RX3 amounts to 1.75.

The distance between the three transmitting antennas TX1, TX2, and TX3 in horizontal direction x amounts to 1.75 in each case.

Transmitting antenna TX2, which is situated in the center between TX1 and TX3, is offset upward in vertical direction y by value 1. Subarray TX is thus symmetric to an axis A that runs in direction y.

In the vertical direction, the lower end of receiving antenna RX4 directly connects to the upper end of transmitting antenna TX2, so that the vertical dimension of circuit board 10 has the smallest possible value, at which the subarrays are free from overlaps. In the horizontal direction, the dimension of the circuit board is minimized by the fact that antennas RX1 and TX1 at the left-hand edge of the circuit board are aligned with regard to one another.

The three transmitting antennas TX1, TX2, and TX3 are used in the time division multiplex one after another for transmitting radar signals. The radar sensor is configured overall as a FMCW radar that operates according to the principle described in WO 2015/188987 A1. In this way, the distance changes of the located radar targets, taking place as a result of the proper motion of these targets during the time periods that separate the activity periods of the different transmitting antennas from one another, are compensated for.

When a radar target is located at an azimuth angle that is different from 0°, the signal paths from the transmitting antenna to the target and from the target back to the transmitting antenna have different lengths for each combination of transmitting and receiving antennas. Each combination of transmitting antenna and receiving antenna thus corresponds to a virtual antenna element, and the positions of these virtual antenna elements in direction x are provided by the x component of the signal paths. The virtual aperture of this virtual antenna array is thus considerably larger than the real aperture of the receiving antennas. As a result of this enlarged aperture, azimuth angles may be measured with higher selectivity.

Since in subarray TX as well as in subarray RX one of the transmitting or receiving antennas is offset with regard to the other antennas in each case in vertical direction y, a larger virtual aperture and thus a higher separability results during the measurement of the elevation angle.

However, the vertical offset of the antennas, in the case of targets having an elevation angle that deviates considerably from 0°, may bring about a systemic error during the measurement of the azimuth angle, since the phase shift between the different virtual antenna elements is not a function of the azimuth angle alone, but also of the elevation angle. For this reason, the vertical offset of transmitting antenna TX2 with regard to the other transmitting antennas is significantly smaller in the example shown here than the offset of receiving antenna RX4 with regard to the other receiving antennas. Control and evaluation device 14 is configured in such a way that it takes into consideration during the measurement of the azimuth angle only those virtual antenna elements that are formed when receiving antennas RX1 through RX3 are participating, i.e., the signal from RX4 is ignored during the measurement of the azimuth angle, so that the systemic error caused by the significant offset of receiving antenna RX4 is not considered in the measuring result. As a result of the relatively small offset of transmitting antenna TX2, the systemic error still remaining at the time may be tolerated.

During the measurement of the azimuth angle as well as during the measurement of the elevation angle, the measuring principle is based on a maximum likelihood estimation on the basis of the correlation of the phases measured with the aid of the different virtual antenna elements or complex amplitudes with the aid of the antenna diagram for the provided antenna array. This correlation is indicated by a DML function that has a maximum at the angle corresponding to the actual location of the target. However, this DML function also has secondary maxima in the case of angles that significantly deviate from the actual location of the radar target.

If in an antenna array the transmitting and receiving antennas are offset on the horizontal as well as on the vertical, it generally results in that during the measurement of the azimuth angle the proportions between the primary maximum and the secondary maxima also depend on the elevation angle of the target. This effect tends to result in that with increasing elevation angle the height of the (or at least of some) secondary maxima increases in relation to the height of the primary maximum, so that, since the measured signals are more or less noisy in practice, measurement errors may occur, as one of the secondary maxima may be erroneously regarded as the primary maximum. In the case of the antenna array described here, this effect is, however, largely suppressed in that vertically offset transmitting antenna TX2 is arranged exactly in the center between the two other transmitting antennas TX1 and TX3. This symmetry results in that with increasing elevation angle the secondary maxima increase less quickly in relation to the primary maximum than in the case of an asymmetric transmitting subarray. This effect is to be illustrated in the following based on some exemplary diagrams.

Figure 2:
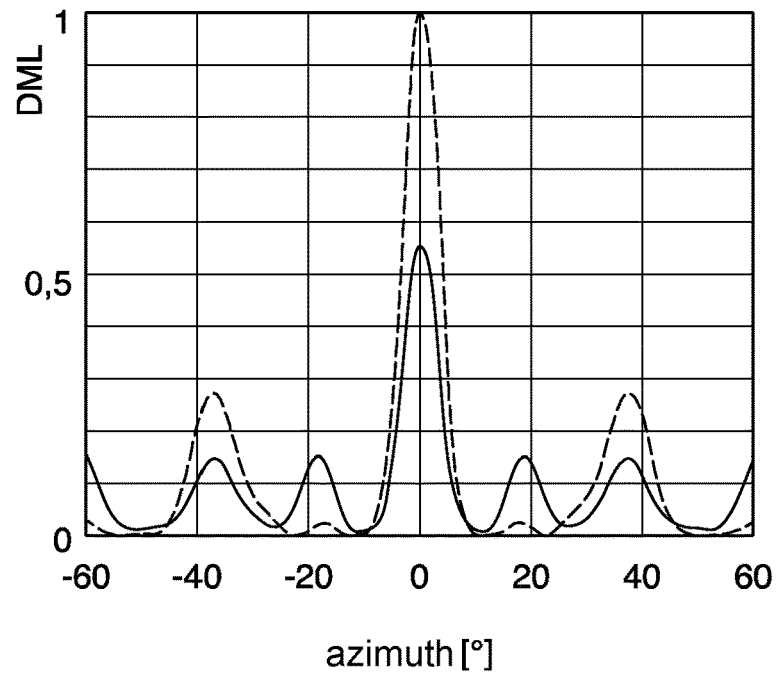
FIG. 2 through FIG. 5 show function graphs of DML functions for targets at different azimuth and elevation angles, for the antenna array of the radar sensor according to the present invention, and an array for comparison purposes.

In FIG. 2, the function value of the DML function, which computationally results for the antenna array shown in FIG. 1, is plotted for the azimuth angle in a value range of −60° through +60° and for a radar target in the case of an azimuth angle of 0° and an elevation angle of 0° (dashed line) or 15° (solid line). In the case of the greater elevation angle (solid line), the maximum at 0° is pronounced significantly less strongly than in the case of the elevation angle of 0°; the next highest secondary maxima (at ±38°) are also reduced, however, while the first secondary maxima (at ±19°) are stronger in the case of the greater elevation angle. The distance between the primary maximum and the next highest secondary maxima remains so large, however, that measurement errors as a result of noise are not to be suspected.

Figure 3:
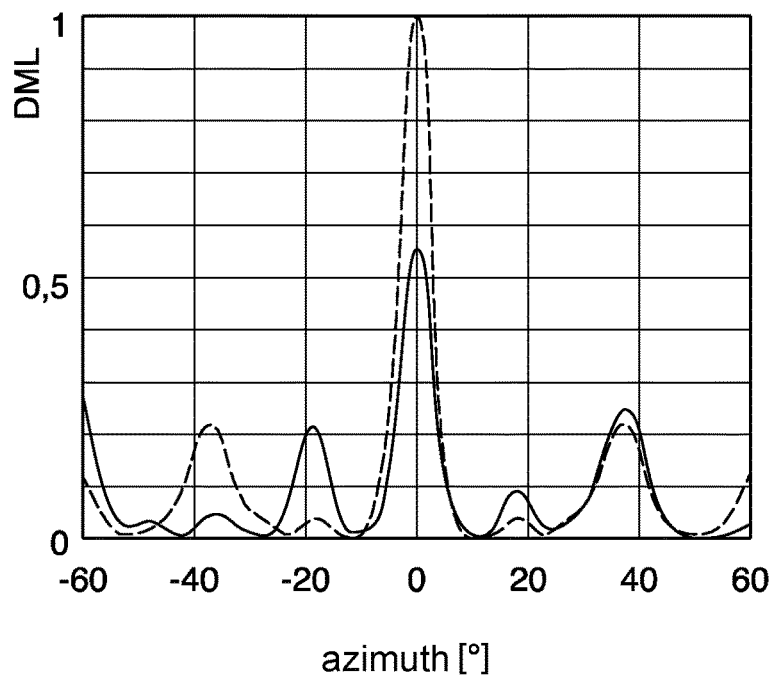

FIG. 3 shows the same DML diagram for an antenna array, in which as compared to FIG. 1 the horizontal position of transmitting antenna TX2 is shifted to the right by 0.25 (in the units of the wavelength) and the symmetry of subarray TX is thus broken. While the dashed curve for the elevation angle of 0° continues to be symmetric, the curve for the elevation angle of 15° (solid line) is now asymmetric. The first secondary maximum at −19° is greater than the first secondary maximum at +19°, while the situation is exactly reversed in the case of the second secondary maxima at ±38°. The distance between the primary maximum and the greatest secondary maximum at +38° is smaller in this case than in FIG. 1, but it is still sufficient.

Figure 4:
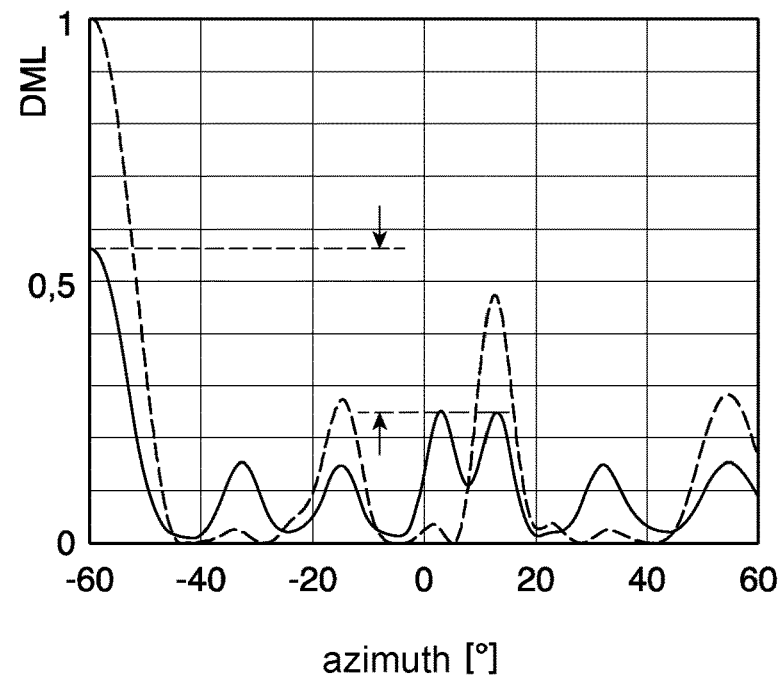
Figure 5:
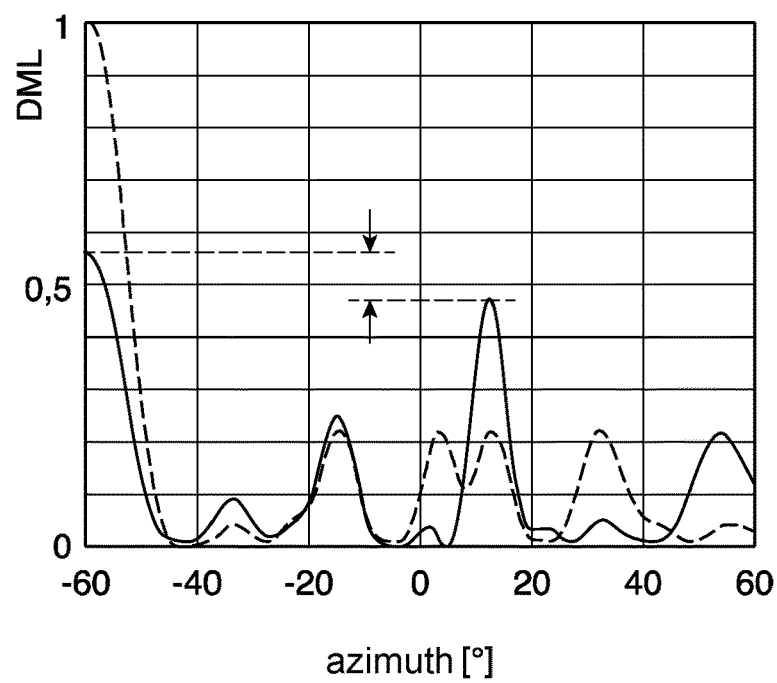

FIG. 4 and FIG. 5 show the same for a radar target that is located at the azimuth angle of −60°. In the antenna array according to the present invention (FIG. 4), in the case of the elevation angle of 15° (solid line) there is still a significant distance between the primary maximum and the highest secondary maximum (dashed horizontal lines and arrows in FIG. 4). In contrast thereto, in the asymmetric antenna array (FIG. 5), this distance has critically decreased, so that in the case of signals that are highly noisy measurement errors can no longer be excluded.

As illustrated in the diagrams in FIG. 2 through FIG. 5, the comparably great height of the secondary maxima in FIGS. 3 and 5 is predominantly due to the asymmetry of these curves. A sufficient distance between the primary maximum and the highest secondary maximum may thus generally also be achieved in the case of great elevation angles in that the arrangement of the transmitting antennas is symmetric. In other specific embodiments, the number of the transmitting antennas could also be greater than 3, however, and an uneven number of antennas would also be possible, if the number of the vertically offset antennas is even. Specific embodiments of the present invention, in which not the transmitting antennas, but the receiving antennas are symmetrically arranged, are likewise also possible.

What is claimed is:

1. A multiple input multiple output (MIMO) radar sensor, comprising:
    a planar antenna arrangement including a first antenna array, which is formed of a plurality of transmitting antennas and a second antenna array, which is formed of a plurality of receiving antennas, wherein:
        the plurality of transmitting antennas of the first antenna array are offset relative to one another in a first direction;
        the plurality of receiving antennas of the second antenna array are offset relative to one another in the first direction;
        the first and second antenna arrays are offset from each other in a second direction that is perpendicular to the first direction;
        each of the antennas of the first and second two sub arrays is being more strongly focused in the second direction than in the first direction; and
        in each of at least one of the first and second antenna arrays:
            at least two of the antennas of the respective antenna array are offset from one another in the second direction; and
            all of the antennas of the respective antenna array are, in combination, symmetrically arranged relative to an axis that runs in the second direction, at a same side of the antennas of the other one of the antenna arrays;
    a high frequency element configured to generate respective transmit signals for the transmitting antennas of the first antenna array and to preprocess respective received signals of the receiving antennas of the second antenna array; and
    a control and evaluation device configured to control the high frequency element and to determine distances, relative velocities, and azimuth and elevation angles of located objects based on the preprocessed received signals.

2. The radar sensor as recited in claim 1, wherein the first direction is horizontal and the second direction is vertical.

3. The radar sensor as recited in claim 1, wherein the at least one of the first and second arrays is formed by the transmitting antennas.

4. The radar sensor as recited in claim 3, wherein one of the receiving antennas of the second array is offset relative to other ones of the receiving antennas of the second array in the second direction.

5. The radar sensor as recited in claim 4, wherein the offset in the second direction in the second array, which is of the receiving antennas, is greater than the offset in the second direction in the first array, which is of the transmitting antennas, and the control and evaluation device is configured to ignore, when estimating an angle in the first direction, the signals of the one of the receiving antennas that is offset in the second direction.

6. The radar sensor as recited in claim 1, wherein the each of the at least one of the first and second arrays, in which the all of the antennas are symmetrically arranged, has an uneven number of antennas.

7. The radar sensor as recited in claim 6, wherein only a central one of the antennas of the each of the at least one of the first and second arrays in which all of the antennas are symmetrically arranged is offset in the second direction from other ones of the antennas of the respective array.

8. The radar sensor as recited in claim 1, wherein:
each pair of the transmitting antennas that are immediately adjacent to each other in the first direction are spatially separated from each other;
each pair of the receiving antennas that are immediately adjacent to each other in the first direction are spatially separated from each other; and
there is no spatial separation in the second direction between the first and second arrays.

\* \* \* \* \*